United States Patent
Wu

(10) Patent No.: US 9,122,096 B2
(45) Date of Patent: Sep. 1, 2015

(54) LED LIGHTBAR FOR BACKLIGHT MODULE, AND BACKLIGHT MODULE

(75) Inventor: Yue Wu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 161 days.

(21) Appl. No.: 13/574,465

(22) PCT Filed: Jun. 15, 2012

(86) PCT No.: PCT/CN2012/077000
§ 371 (c)(1),
(2), (4) Date: Jul. 20, 2012

(87) PCT Pub. No.: WO2013/185347
PCT Pub. Date: Dec. 19, 2013

(65) Prior Publication Data
US 2013/0335958 A1 Dec. 19, 2013

(30) Foreign Application Priority Data
Jun. 13, 2012 (CN) .......................... 2012 1 0194468

(51) Int. Cl.
*F21S 4/00* (2006.01)
*G02F 1/1335* (2006.01)

(52) U.S. Cl.
CPC .................. *G02F 1/133603* (2013.01); *G02F 2001/133628* (2013.01)

(58) Field of Classification Search
USPC .......... 362/97.1–97.3, 217.01, 217.1, 217.14, 362/218, 219, 225, 227, 253, 294, 611–613
See application file for complete search history.

(56) References Cited

U.S. PATENT DOCUMENTS

| 2008/0123023 A1 | 5/2008 | Doan et al. | |
|---|---|---|---|
| 2010/0123851 A1* | 5/2010 | Mo et al. | 349/58 |
| 2011/0103093 A1* | 5/2011 | Tsai et al. | 362/612 |
| 2012/0140146 A1* | 6/2012 | Baba | 349/62 |
| 2012/0275191 A1* | 11/2012 | Zhou | 362/612 |

FOREIGN PATENT DOCUMENTS

| CN | 2702999 Y | 6/2005 |
|---|---|---|
| CN | 200999033 Y | 1/2008 |

(Continued)

OTHER PUBLICATIONS

Hu Yang, the International Searching Authority written comments, Mar. 2013, CN.

*Primary Examiner* — Meghan Dunwiddie
(74) *Attorney, Agent, or Firm* — IPro, Inc.; Na Xu

(57) ABSTRACT

The invention relates to the field of LCDs, and more particularly to an LED lightbar for a backlight module, and a backlight module. The front face of the LED lightbar is provided with LED lights, and the back face of the LED lightbar is a plane used for the sticking of a thermal conductive adhesive; the back face of the LED lightbar is provided with positioning edge(s) used for positioning the thermal conductive adhesive, and the positioning edge(s) is protruded from the back plane of the LED lightbar. The back face of the LED lightbar for a backlight module of the invention is provided with positioning edge(s) used for positioning the thermal conductive adhesive, and the positioning edge(s) is protruded from the back plane of the LED lightbar. When sticking the thermal conductive adhesive, the operator can align the thermal conductive adhesive with the edge of the positioning edge(s) to tidily stick. If being tidily stuck, the thermal conductive adhesive is tightly matched with the LED lightbar. Because the thermal conductive adhesive is not pulled to be straight, the inward pulling stress is avoided. Thus, even under severe conditions, the adhesive failure and deformation are not easily generated, and the stability and heat dissipating effect of the backlight module are guaranteed.

18 Claims, 4 Drawing Sheets

(56) References Cited

FOREIGN PATENT DOCUMENTS

| | | |
|---|---|---|
| CN | 201237105 Y | 5/2009 |
| CN | 201576701 U | 9/2010 |
| CN | 202109288 U | 1/2012 |
| KR | 20-0446857 Y1 | 12/2009 |
| TW | 201123387 A | 7/2011 |

* cited by examiner

LED LIGHTBAR FOR BACKLIGHT MODULE, AND BACKLIGHT MODULE

TECHNICAL FIELD

The invention relates to the field of liquid crystal displays (LCDs), and more particularly to a light emitting diode (LED) lightbar for a backlight module, and a backlight module.

BACKGROUND

Because of the advantages of high light-emitting efficiency, energy saving, environmental protection and long service life, LED light sources as backlight sources are widely used in LCD devices. Because LED(s) has high heat productivity, an LED lightbar needs a special heat dissipating base. To ensure the heat-conducting property between the LED lightbar and the heat dissipating base, the back of the LED lightbar is generally provided with a thermal conductive adhesive, and then both the LED lightbar and the thermal conductive adhesive are stuck to the heat dissipating base. The conventional LED lightbar is of a strip-shaped plate structure. The front face of the LED lightbar is provided with LED lights, and the back of the LED lightbar is a plane. When being stuck, the thermal conductive adhesive is difficult to tidily and tightly be stuck to the back plane of the LED lightbar because of narrowness, softness and long length of the thermal conductive adhesive. As shown in FIG. 1, if the thermal conductive adhesive 2 is untidily stuck, the heat dissipating uniformity of the LED lightbar 1 may be affected. As shown in FIG. 2, if the thermal conductive adhesive 2 is not tightly stuck to the back of the LED lightbar 1, bubbles may be generated, thereby blocking heat conduction.

To better stick the thermal conductive adhesive, the thermal conductive adhesive is usually pulled to be straight, and then stuck to the back of the LED lightbar, thereby enabling the thermal conductive adhesive to have inward pulling stress. Under the conditions that the backlight module is lightened, heated, placed for a long time, affected with damp, etc., the inward pulling stress generated when sticking the thermal conductive adhesive causes the thermal conductive adhesive to sharply retract, thereby resulting in adhesive failure and deformation, and affecting the heat dissipating effect and stability of the LED lightbar.

SUMMARY

In view of the above-described problems, the aim of the invention is to provide an LED lightbar for a backlight module, and a backlight module. After sticking with the thermal conductive adhesive, the LED lightbar becomes tidier and tighter, and has higher sticking efficiency.

A first technical scheme of the invention is that: an LED lightbar for a backlight module, the front face of the LED lightbar is provided with LED lights, and the back face of the LED lightbar is a plane used for the sticking of a thermal conductive adhesive; the back face of the LED lightbar is provided with positioning edges used for positioning the thermal conductive adhesive, the positioning edges are protruded from the back plane of the LED lightbar, and the positioning edges are positioned on the upper edge and the lower edge of the back face of the LED lightbar. The positioning edges are of sectioned structures and formed by a plurality of small sections, and each small section of the positioning edges is in a rectangle or trapezoid shape.

A second technical scheme of the invention is that: an LED lightbar for a backlight module, the front face of the LED lightbar is provided with LED lights, and the back face of the LED lightbar is a plane used for the sticking of a thermal conductive adhesive; the back face of the LED lightbar is provided with positioning edge(s) used for positioning the thermal conductive adhesive, and the positioning edge(s) are protruded from the back plane of the LED lightbar.

Preferably, the positioning edge(s) is positioned on the upper edge of the back face of the LED lightbar. When sticking the thermal conductive adhesive, the operator can only align the thermal conductive adhesive with the upper positioning edge.

Preferably, the positioning edge(s) is positioned on the lower edge of the back face of the LED lightbar. When sticking the thermal conductive adhesive, the operator can align the thermal conductive adhesive with the lower positioning edge.

Preferably, the positioning edges are positioned on the upper edge and the lower edge of the back face of the LED lightbar.

Preferably, the positioning edge(s) is of a sectioned structure and comprises a plurality of small sections. When the LED lightbar and the thermal conductive adhesive are stuck to the heat dissipating base, the thermal conductive adhesive may generate compressive stress, and the thermal conductive adhesive may deform to the gap between adjacent small sections, thereby releasing partial compressive stress.

Preferably, each small section of the positioning edge(s) is in a rectangle or trapezoid shape.

Preferably, the positioning edge is in a rectangle square wave shape and can provide deformation space for the thermal conductive adhesive as well, thereby releasing partial compressive stress.

Preferably, the positioning edge is in a trapezoidal wave shape and can provide deformation space for the thermal conductive adhesive as well, thereby releasing partial compressive stress.

Advantages of the invention are summarized below: the back face of the LED lightbar for a backlight module of the invention is provided with positioning edges used for positioning the thermal conductive adhesive, and the positioning edges are protruded from the back plane of the LED lightbar. When sticking the thermal conductive adhesive, the operator can align the thermal conductive adhesive with the edge of the positioning edge(s) to tidily stick. If being tidily stuck, the thermal conductive adhesive is tightly matched with the LED lightbar. Because the thermal conductive adhesive is not pulled to be straight, the inward pulling stress is avoided. Thus, even under severe conditions, the adhesive failure and deformation are not easily generated, and the stability and heat dissipating effect of the backlight module are guaranteed.

The invention further provides a third technical scheme: a backlight module comprises the aforementioned LED lightbar, a heat dissipating base, and a thermal conductive adhesive; one side of the thermal conductive adhesive is stuck with the LED lightbar, and the other side of the thermal conductive adhesive is stuck with the heat dissipating base; the height of the positioning edge(s) of the LED lightbar is less than the thickness of the thermal conductive adhesive.

Preferably, the heat dissipating base is made of an aluminum extrusion.

The height of the positioning edge(s) of the LED lightbar for a backlight module of the invention is less than the thickness of the thermal conductive adhesive, to prevent the positioning edge(s) from affecting the sticking between the thermal conductive adhesive and the heat dissipating base.

Legends: 1. LED lightbar; 11. LED light; 12. positioning edge; 2. thermal conductive adhesive.

DETAILED DESCRIPTION

Figure 1:
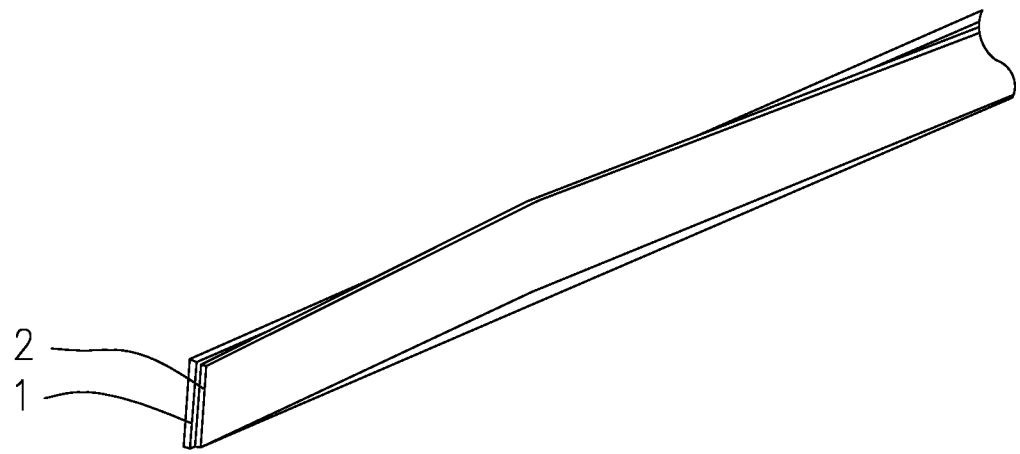
FIG. 1 is a schematic diagram of an untidy sticking structure of a conventional LED lightbar and a thermal conductive adhesive.
Figure 2:
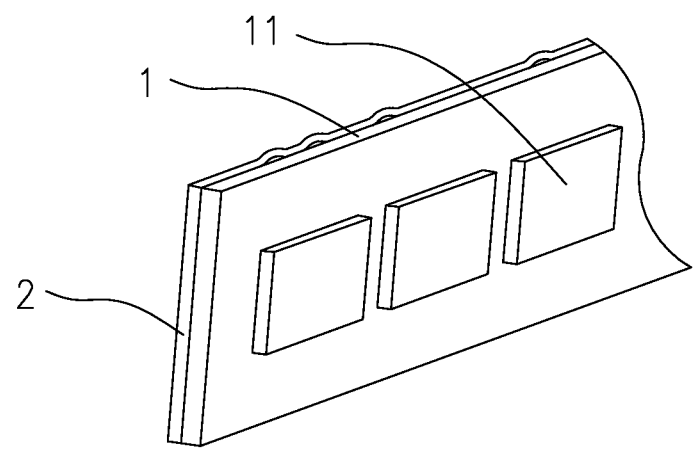
FIG. 2 is a schematic diagram of an untight sticking structure of a conventional LED lightbar and a thermal conductive adhesive.
Figure 3:
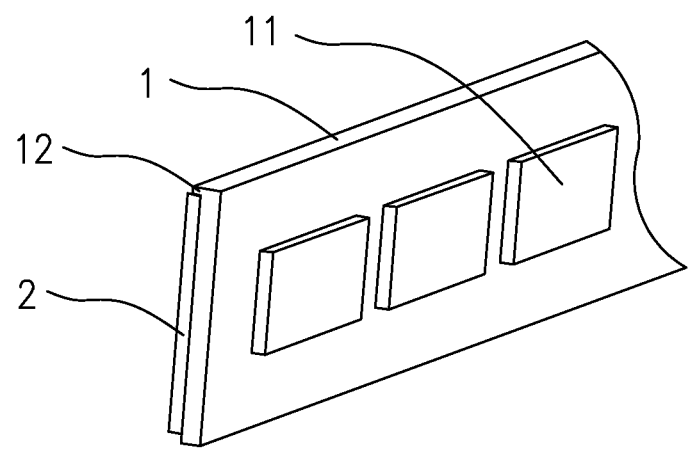
FIG. 3 is a schematic diagram of a sticking structure of an LED lightbar with an upper positioning edge and a thermal conductive adhesive of a backlight module of the invention.

The invention provides a backlight module, comprising an LED lightbar, a heat dissipating base, and a thermal conductive adhesive; one side of the thermal conductive adhesive is stuck with the LED lightbar, and the other side of the thermal conductive adhesive is stuck with the heat dissipating base. Preferably, the heat dissipating base is made of an aluminum extrusion. FIG. 3 shows a first example of the LED lightbar for a backlight module of the invention. The front face of the LED lightbar 1 is provided with LED lights 11, and the back face of the LED lightbar 1 is a plane used for the sticking of the thermal conductive adhesive 2; the back face of the LED lightbar is provided with a positioning edge(s) 12 used for positioning the thermal conductive adhesive 2, and the positioning edge 12 is protruded from the back plane of the LED lightbar 1.

In the example, the positioning edge 12 is positioned on the upper edge of the back face of the LED lightbar 1. The positioning edge 12 is of a connecting strip structure, and is integratedly formed with the LED lightbar 1. The height of the positioning edge 12 of the LED lightbar 1 is less than the thickness of the thermal conductive adhesive 2, to prevent the positioning edge 12 from affecting the sticking between the thermal conductive adhesive 2 and the heat dissipating base.

The back face of the LED lightbar 1 for a backlight module of the invention is provided with the a positioning edge 12 used for positioning the thermal conductive adhesive 2, and the positioning edge 12 is protruded from the back plane of the LED lightbar 1. When sticking the thermal conductive adhesive 2, the operator can align the thermal conductive adhesive 2 with the edge of the positioning edge 12 to tidily stick the thermal conductive adhesive 2. If being tidily stuck, the thermal conductive adhesive 2 is tightly matched with the LED lightbar 1. Because the thermal conductive adhesive 2 is not pulled to be straight, the inward pulling stress is avoided. Thus, even under severe conditions, the adhesive failure and deformation are not easily generated, and the stability and heat dissipating effect of the backlight module are guaranteed.

Figure 4:
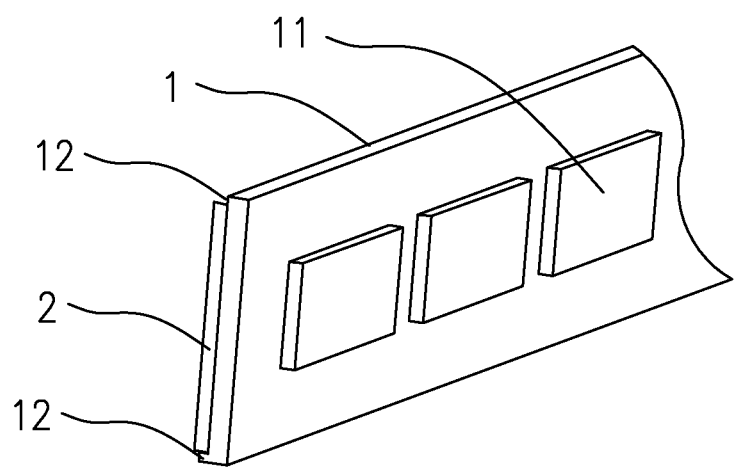
FIG. 4 is a schematic diagram of a sticking structure of an LED lightbar with a lower positioning edge and a thermal conductive adhesive of a backlight module of the invention.

FIG. 4 shows a second example of the LED lightbar for a backlight module of the invention, and the second example is different from the first example in that: the positioning edge 12 is positioned on the lower edge of the back face of the LED lightbar 1. When sticking the thermal conductive adhesive 2, the operator can align the thermal conductive adhesive 2 with the lower positioning edge. The rest structures and advantages are the same as the first example; thus, the example will not give unnecessary details.

Figure 5:
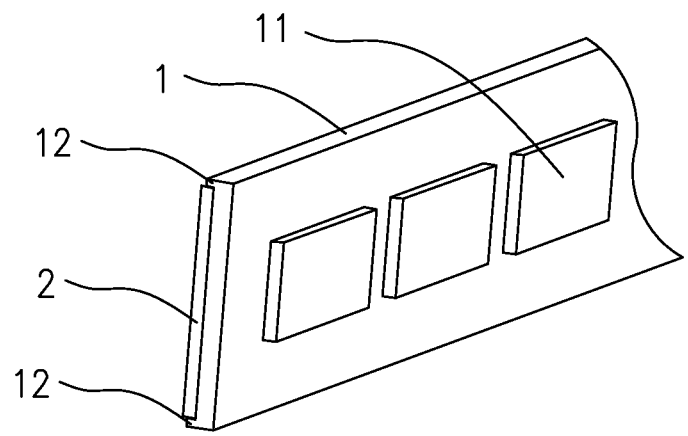
FIG. 5 is a schematic diagram of a sticking structure of an LED lightbar with an upper positioning edge and a lower positioning edge and a thermal conductive adhesive of a backlight module of the invention.

FIG. 5 shows a third example of the LED lightbar for a backlight module of the invention, and the third example is different from the first example in that: the positioning edges 12 are positioned on the upper edge and the lower edge of the back face of the LED lightbar. The rest structures and advantages are the same as the first example; thus, the example will not give unnecessary details.

Figure 6:
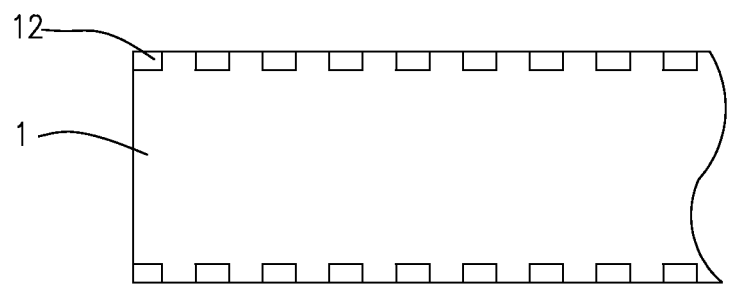
FIG. 6 is a structure diagram of a positioning edge of an LED lightbar of one example of the invention.
Figure 7:
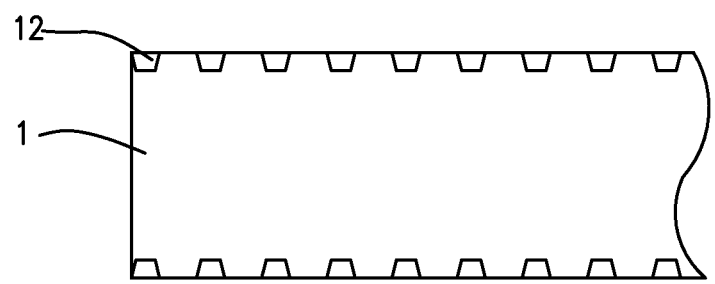
FIG. 7 is a structure diagram of a positioning edge of an LED lightbar of another example of the invention.

All the positioning edges motioned above are of connecting strip structures. In another example, as shown in FIG. 6 and FIG. 7, the positioning edge 12 is of a sectioned structure, and comprises a plurality of small sections. Each small section of the positioning edge 12 is in a rectangle or trapezoid shape. When the LED lightbar 1 and the thermal conductive adhesive are stuck to the heat dissipating base, the thermal conductive adhesive may generate compressive stress, and the thermal conductive adhesive may deform to the gap between adjacent small sections, thereby releasing partial pressure stress.

Figure 8:
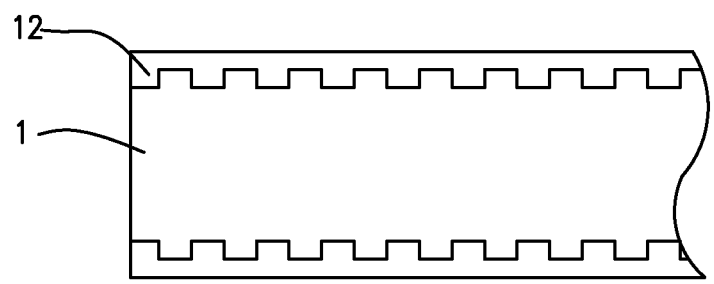
FIG. 8 is a structure diagram of a positioning edge of an LED lightbar of a third example of the invention.
Figure 9:
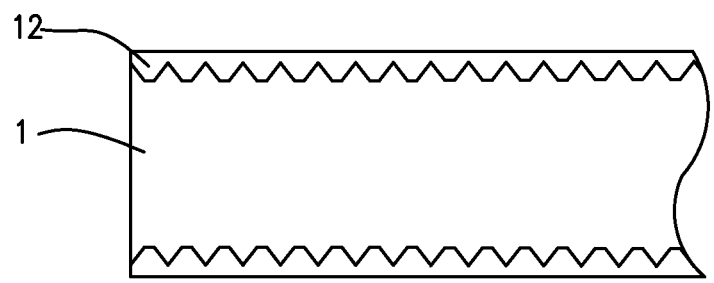
FIG. 9 is a structure diagram of a positioning edge of an LED lightbar of a fourth example of the invention.

In an another example, as shown in FIG. 8 and FIG. 9, the positioning edge 12 is in a rectangle square wave or trapezoidal wave shape and also can provide deformation space for the thermal conductive adhesive, thereby releasing partial compressive stress.

The invention is described in detail in accordance with the above contents with the specific preferred examples. However, this invention is not limited to the specific examples. For the ordinary technical personnel of the technical field of the invention, on the premise of keeping the conception of the invention, the technical personnel can also make simple deductions or replacements, and all of which should be considered to belong to the protection scope of the invention.

I claim:

1. An LED lightbar for a backlight module, wherein the front face of said LED lightbar is provided with LED lights, and the back face of said LED lightbar is a plane used for the sticking of a thermal conductive adhesive; the back face of said LED lightbar is provided with positioning edges used for positioning said thermal conductive adhesive, said positioning edges are protruded from the back plane of said LED lightbar, and said positioning edges are positioned on the upper edge and the lower edge of the back face of said LED lightbar; said positioning edges are of sectioned structure and formed by a plurality of small sections, and each small section of said positioning edges is in a rectangle or trapezoid shape.

2. An LED lightbar for a backlight module, wherein the front face of said LED lightbar is provided with LED lights, and the back face of said LED lightbar is a plane used for the sticking of a thermal conductive adhesive; the back face of said LED lightbar is provided with positioning edge(s) used for positioning said thermal conductive adhesive, and said positioning edge(s) is protruded from the back plane of said LED lightbar.

3. The LED lightbar for a backlight module of claim 2, wherein said positioning edge is positioned on the upper edge of the back face of said LED lightbar.

4. The LED lightbar for a backlight module of claim 2, wherein said positioning edge is positioned on the lower edge of the back face of said LED lightbar.

5. The LED lightbar for a backlight module of claim 2, wherein said positioning edges are positioned on the upper edge and the lower edge of the back face of said LED lightbar.

6. The LED lightbar for a backlight module of claim 2, wherein said positioning edge(s) is of a sectioned structure and comprises a plurality of small sections.

7. The LED lightbar for a backlight module of claim 6, wherein each small section of said positioning edges is in a rectangle or trapezoid shape.

8. The LED lightbar for a backlight module of claim 2, wherein said positioning edge is in a rectangle square wave shape.

9. The LED lightbar for a backlight module of claim 2, wherein said positioning edge is in a trapezoidal wave shape.

10. A backlight module, comprising: an LED lightbar, a heat dissipating base, and a thermal conductive adhesive; wherein one side of said thermal conductive adhesive is stuck with said LED lightbar, and the other side of said thermal conductive adhesive is stuck with said heat dissipating base; the front face of said LED lightbar is provided with LED lights, and the back face of said LED lightbar is a plane used for the sticking of said thermal conductive adhesive; the back face of said LED lightbar is provided with positioning edge(s) used for positioning said thermal conductive adhesive, and said positioning edge(s) is protruded from the back plane of said LED lightbar; the height of the positioning edge of said LED lightbar is less than the thickness of said thermal conductive adhesive.

11. The backlight module of claim 10, wherein said heat dissipating base is made of an aluminum extrusion.

12. The backlight module of claim 10, wherein said positioning edge is positioned on the upper edge of the back face of said LED lightbar.

13. The backlight module of claim 10, wherein said positioning edge is positioned on the lower edge of the back face of said LED lightbar.

14. The backlight module of claim 10, wherein said positioning edges are positioned on the upper edge and the lower edge of the back face of said LED lightbar.

15. The backlight module of claim 10, wherein said positioning edge is of a sectioned structure and comprises a plurality of small sections.

16. The backlight module of claim 15, wherein each small section of said positioning edges is in a rectangle or trapezoid shape.

17. The backlight module of claim 10, wherein said positioning edge is in a rectangle square wave shape.

18. The backlight module of claim 10, wherein said positioning edge is in a trapezoidal wave shape.

* * * * *